US012756931B2

(12) United States Patent
Saito

(10) Patent No.: US 12,756,931 B2
(45) Date of Patent: Oct. 6, 2026

(54) APPARATUS, METHOD FOR APPARATUS, AND STORAGE MEDIUM

(71) Applicant: CANON KABUSHIKI KAISHA, Tokyo (JP)

(72) Inventor: Mitsuhiro Saito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 18/611,073

(22) Filed: Mar. 20, 2024

(65) Prior Publication Data

US 2024/0334055 A1 Oct. 3, 2024

(30) Foreign Application Priority Data

Mar. 27, 2023 (JP) ................................ 2023-050402

(51) Int. Cl.
*H04N 23/68* (2023.01)
*H04N 23/667* (2023.01)

(52) U.S. Cl.
CPC ....... *H04N 23/6811* (2023.01); *H04N 23/667* (2023.01); *H04N 23/6812* (2023.01); *H04N 23/683* (2023.01); *H04N 23/687* (2023.01)

(58) Field of Classification Search
None
See application file for complete search history.

(56) References Cited

U.S. PATENT DOCUMENTS

| | | | | |
|---|---|---|---|---|
| 8,077,923 | B2 * | 12/2011 | Tsubaki | G06T 7/246 382/107 |
| 2018/0367734 | A1 * | 12/2018 | Thumpudi | H04N 23/70 |
| 2019/0222763 | A1 * | 7/2019 | Takayanagi | H04N 23/663 |
| 2020/0412954 | A1 * | 12/2020 | Gaizman | H04N 23/6812 |
| 2024/0040255 | A1 * | 2/2024 | Yuan | H04N 23/6812 |

FOREIGN PATENT DOCUMENTS

| | | |
|---|---|---|
| JP | 2017215350 A | 12/2017 |

* cited by examiner

*Primary Examiner* — Cynthia Calderon
(74) *Attorney, Agent, or Firm* — Canon U.S.A., Inc. IP Division

(57) ABSTRACT

An apparatus includes one or more processors and/or circuitry which function as a detection unit configured to detect an object from an image, a first obtaining unit configured to obtain object motion information indicating information about a temporal change of a position of the object detected in the image, a second obtaining unit configured to obtain image motion information indicating a motion of a capturing apparatus, a control unit configured to control a stabilization unit using a first mode for giving priority to object tracking and a second mode for giving priority to stabilization, and a setting unit configured to set a reference position being a control center of the stabilization based on the object motion information in a case where a determination unit determines to switch from the first mode to the second mode.

19 Claims, 7 Drawing Sheets

APPARATUS, METHOD FOR APPARATUS, AND STORAGE MEDIUM

BACKGROUND

Technical Field

The aspect of the embodiments relates to a technique for stabilizing an object image using an image stabilization unit.

Description of the Related Art

Various image stabilization functions for correcting an image blur caused by a camera shake or the like applied to an image capturing apparatus, such as a digital camera, have recently been proposed. Such image stabilization functions to be incorporated in an image capturing apparatus make it possible to obtain more excellent captured images. Further, a technique for correcting a motion blur due to a change in the position of an object such as a person (also referred to as tracking) separately from a camera shake caused by a user holding a main body of the image capturing apparatus has also been proposed. The camera shake caused by the user can be detected based on a detection result of an angular velocity sensor attached to the image capturing apparatus, or a movement amount of a still region (also referred to as a background region) in a captured image. On the other hand, a motion blur can be detected based on the movement amount of the position of the object by an object recognition unit or the like. Such a motion blur can be corrected by controlling an image stabilization unit based on the detected position of the object so that the object is maintained at a specific position, such as the center of the image.

An image capturing apparatus discussed in Japanese Patent Application Laid-Open No. 2017-215350 executes object tracking and camera shake correction based on a tracking target position of a detected object and a detection signal of a camera shake caused in the image capturing apparatus. In this case, a control unit determines which one of a mode for giving priority to the object tracking and a mode for giving priority to the camera shake correction is to be executed depending on an image capturing state of the image capturing apparatus.

In the case of switching from the mode for giving priority to the object tracking to the mode for giving priority to the camera shake correction, as in the image capturing apparatus discussed in Japanese Patent Application Laid-Open No. 2017-215350, there is a possibility that an object may be outside an image capturing range immediately after the switching.

SUMMARY

According to an aspect of the embodiments, an apparatus includes one or more processors and/or circuitry which function as a detection unit configured to detect an object from an image, a first obtaining unit configured to obtain object motion information indicating information about a temporal change of a position of the object detected in the image, a second obtaining unit configured to obtain image motion information indicating a motion of a capturing apparatus configured to capture the image, a control unit configured to control a stabilization unit using a first mode for giving priority to object tracking to correct the position of the object in the image and a second mode for giving priority to stabilization to correct an image blur due to the motion of the capturing apparatus, a determination unit configured to determine whether to switch from the first mode to the second mode, and a setting unit configured to set a reference position being a control center of the stabilization based on the object motion information in a case where the determination unit determines to switch from the first mode to the second mode.

Other aspects of the disclosure will be described in detail in an exemplary embodiment described below.

Further features of the disclosure will become apparent from the following description of exemplary embodiments with reference to the attached drawings.

DESCRIPTION OF THE EMBODIMENTS

Figure 1:
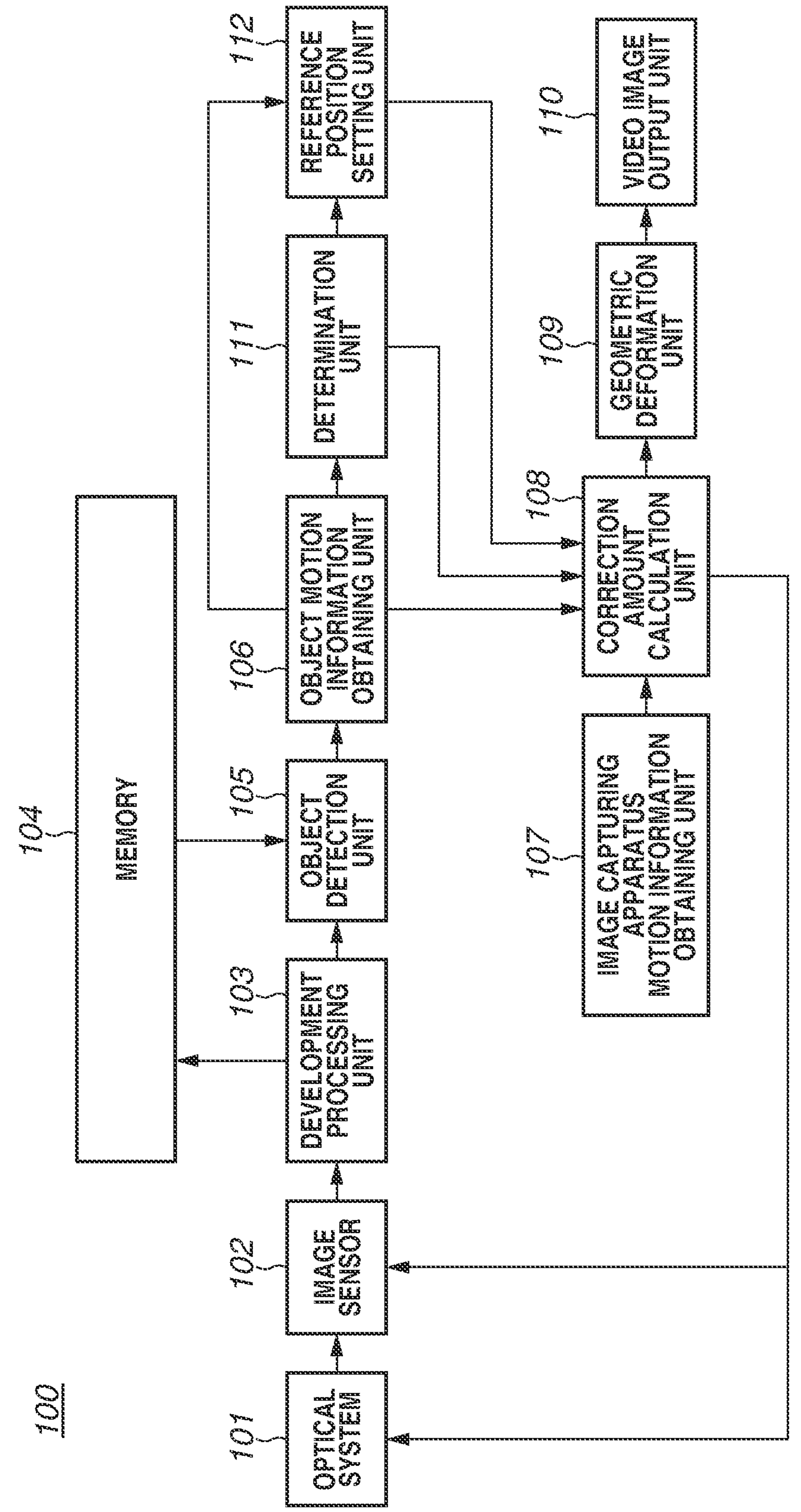
FIG. 1 is a block diagram illustrating a configuration example of an image capturing apparatus according to an exemplary embodiment.

An exemplary embodiment of the disclosure will be described below with reference to the accompanying drawings. The following exemplary embodiment is not intended to limit the disclosure. While multiple features are described in the exemplary embodiment, not all of these features are essential to the disclosure, and these features may be freely combined. In the accompanying drawings, the same reference numerals are given to the same or similar components, and redundant description thereof is omitted.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM). Examples of firmware may include microcode, writable control store, micro-programmed structure.

When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any non-transitory medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

In the present exemplary embodiment, an example of an image capturing apparatus, serving as an image stabilization apparatus, including an electronic image stabilization unit that corrects an image blur by performing image processing such as geometric deformation on an obtained image signal will be described.

The image capturing apparatus according to the present exemplary embodiment implements, by controlling the electronic image stabilization unit, a function of executing object tracking that maintains the position of a main object in the image at a specific position within an image capturing range, and a function of executing camera shake correction that corrects a motion of the image capturing apparatus itself. The object tracking is also referred to as object image stabilization. Herein, the camera shake correction includes not only correction of a camera shake due to a shake of a user's hand, but also correction of a camera shake due to a shake transmitted via a vehicle or building, for example, in a case where the image capturing apparatus is fixed to the vehicle or building.

In the case of switching from the mode for giving priority to the object tracking to the mode for giving priority to the camera shake correction, the image capturing apparatus according to the present exemplary embodiment sets a reference position for the camera shake correction after the switching based on a motion of an object. This prevents a situation where the object is outside the image capturing range immediately after switching to the mode for giving priority to the camera shake correction. Hereinafter, the present exemplary embodiment will be described in detail. The term image capturing range refers to a range of an image to be displayed or recorded. The image capturing range does not necessarily match a range of an image captured by an image sensor. If clipping processing is performed in geometric deformation processing, a range of a clipped image is referred to as the image capturing range.

FIG. 1 is a block diagram illustrating a configuration example of an image capturing apparatus 100 that is the image stabilization apparatus according to the present exemplary embodiment. The image capturing apparatus 100 includes an optical system 101, an image sensor 102, and a development processing unit 103. The optical system 101 forms an object image. The image sensor 102 is, for example, a charge-coupled device (CCD) sensor or a complementary metal-oxide semiconductor (CMOS) sensor, and photoelectrically converts the object image formed by the optical system 101. The development processing unit 103 forms an image signal from an electric signal output from the image sensor 102.

The development processing unit 103 includes an analog-to-digital (A/D) conversion circuit, an automatic gain control (AGC) circuit, and an automatic white balance (AWB) circuit, which are not illustrated, and forms a digital signal. The image sensor 102 and the development processing unit 103 constitute an image capturing system for obtaining an image. One or more frame images of the image signal formed by the development processing unit 103 are directly used for display and processing and are temporarily stored and held in a memory 104.

An object detection unit 105 performs object detection processing on the image signal output from the development processing unit 103, thereby detecting an object to be tracked (hereinafter also referred to as a main object). The main object is a moving object. Examples of the main object include a person (face), an animal, and a vehicle such as a train or an aircraft. A known technique may be used as a method for detecting the main object. Examples of the main object detection method include matching processing to be executed using an object to be detected as a template, and processing of holding a feature amount of an object as data and searching for a region with the same feature amount. As another example, a method of forming a discriminator for recognizing an object using a learning algorithm as typified by a neural network can be used.

An object motion information obtaining unit 106 obtains information indicating how the object detected by the object detection unit 105 moves on the image with time, or motion information indicating a temporal change of the position of the object in the image. The motion information about the object can be obtained by obtaining positional information about the main object included in a result of the main object detection from the object detection unit 105 in chronological order.

An image capturing apparatus motion information obtaining unit 107 obtains image capturing apparatus motion information indicating motion information about a camerawork motion, a camera shake, or the like caused in the image capturing apparatus 100. The motion of the image capturing apparatus 100 according to the present exemplary embodiment indicates a variation in the position and orientation of the image capturing apparatus 100, and includes not only a user's unintended motion, such as a shake, but also a user's intended motion, such as panning and tilting. The image capturing apparatus motion information may be obtained by any method.

For example, the motion information may be obtained by obtaining a detection result from an inertial sensor, such as a gyroscope sensor or an acceleration sensor, located in the image capturing apparatus 100. A motion amount (background vector) of the entire screen between frame images that are temporally and continuously obtained using the image signal output from the development processing unit 103 may be calculated by image analysis. Any other method may be used.

A correction amount calculation unit 108 calculates a correction amount (driving amount) for the image stabilization unit using the object motion information obtained by the object motion information obtaining unit 106 and the image capturing apparatus motion information obtained by the image capturing apparatus motion information obtaining unit 107. In the case of object tracking, the correction amount is calculated based on the object motion information, and in the case of the camera shake correction, the correction amount is calculated based on the image capturing apparatus motion information. In the case of object tracking, the correction amount may be calculated based on a current object position in the image detected by the object detection unit 105, instead of using the object motion information (or a temporal change of the position of the object in the image). As described above, the image capturing apparatus 100 according to the present exemplary embodiment includes the electronic image stabilization unit. Thus, the correction amount calculated by the correction amount calculation unit 108 corresponds to an amount of geometric deformation in a geometric deformation unit 109. The image stabilization unit performs image stabilization based on the correction amount. Thus, the correction amount calculation unit 108 transmits the calculated correction amount to the image stabilization unit, thereby functioning as an image stabilization control unit.

While the image capturing apparatus 100 according to the present exemplary embodiment includes the electronic image stabilization unit, a method used by the image stabilization unit is not particularly limited, and the image stabilization unit is not necessarily included in a main body of the image capturing apparatus 100. For example, an image signal captured by the image capturing apparatus 100 may be received via wired or wireless communication, and image stabilization may be performed by an image processing apparatus that performs geometric deformation processing on the received image signal.

The geometric deformation unit 109 performs the geometric deformation processing for correcting an image blur using the amount of geometric deformation calculated by the correction amount calculation unit 108. The image obtained after the image blur is corrected is displayed on a display device by a video image output unit 110, or is stored and held in an image storage device (not illustrated).

A determination unit 111 determines whether to continue the object tracking or switch to the camera shake correction. The determination method is not particularly limited. The determination may be performed based on a state of the image capturing apparatus 100, such as a focal length or a motion of the image capturing apparatus 100, or may be performed based on the object motion information. For example, a camera shake becomes more obvious as the focal length increases. Accordingly, if the focal length is more than or equal to a predetermined value, a control mode may be automatically switched from the object tracking to the camera shake correction. Further, a camera shake becomes more obvious as a degree of motion of the image capturing apparatus 100 increases. Accordingly, if the degree of motion of the image capturing apparatus 100 is large, the control mode may be automatically switched from the object tracking to the camera shake correction. Alternatively, the control mode may be automatically switched from the object tracking to the camera shake correction if it is determined that the degree of motion of the object is too large to correct a camera shake using the image stabilization unit, or that it may become impossible to correct the camera shake in the near future, based on the object motion information. The automatic switching from the object tracking to the camera shake correction based on the object motion information as described above makes it possible to continuously generate images with stability on the entire screen, although the object tracking cannot be performed during this time. The control mode may be automatically switched to the camera shake correction not only in a case where the degree of motion of the object is large, but also in a case where, for example, the main object moves extremely fast or changes its direction rapidly so that the motion of the object goes beyond the processing capability or driving ability of the object motion information obtaining unit 106 or the image stabilization unit.

Instead of automatically switching from the object tracking to the camera shake correction by the image capturing apparatus 100, the control mode may be switched from the object tracking to the camera shake correction based on a user instruction. Specifically, if the determination unit 111 has received an instruction to switch to the camera shake correction from a user during the object tracking, the determination unit 111 may determine to execute the camera shake correction, and if the determination unit 111 has not received the switching instruction, the determination unit 111 may determine to continuously execute the object tracking.

Figure 2:
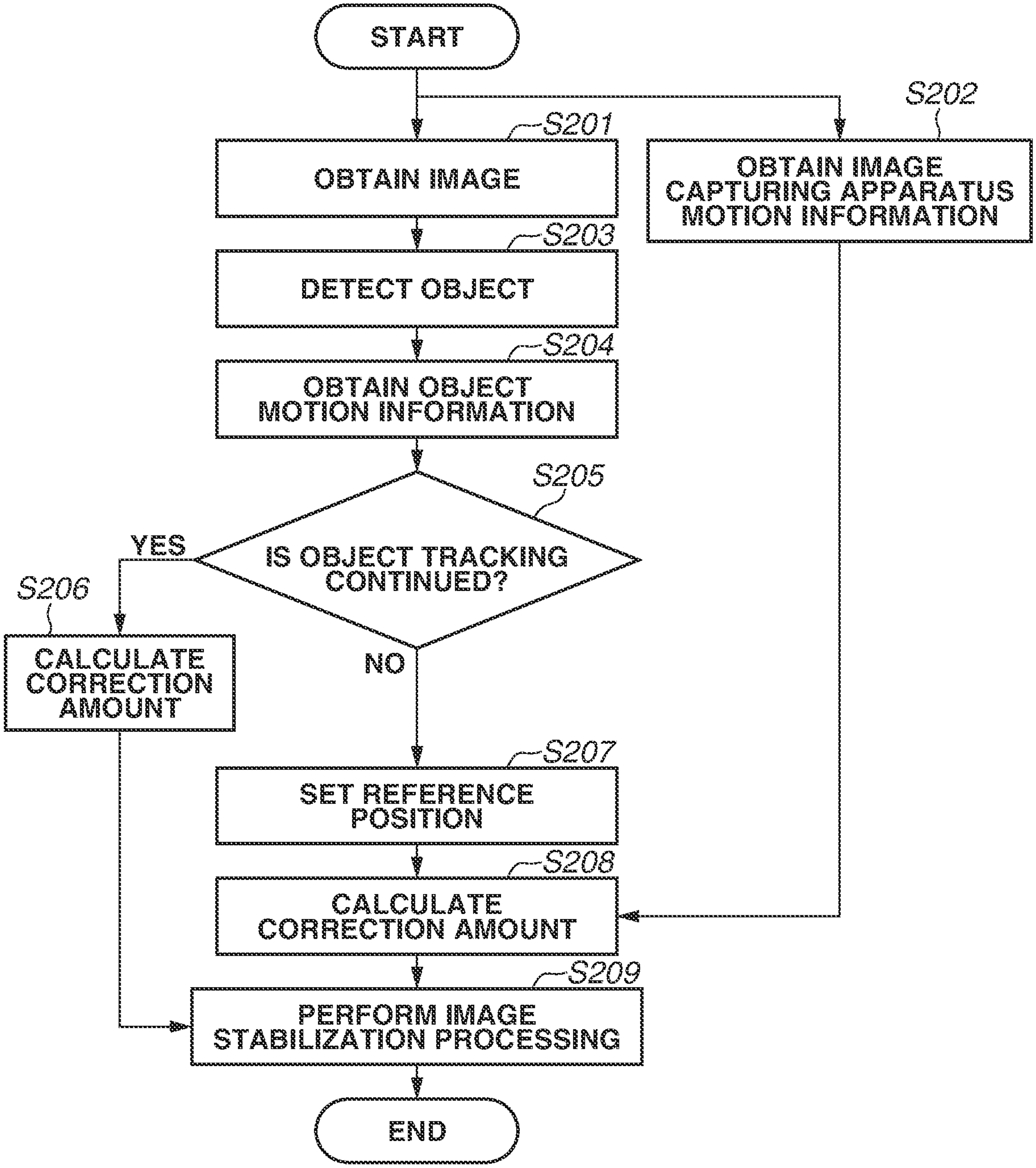
FIG. 2 is a flowchart illustrating an object tracking operation according to the exemplary embodiment.

An object tracking operation to be performed by the image capturing apparatus 100 having a configuration as described above will be described with reference to a flowchart illustrated in FIG. 2. In the present exemplary embodiment, steps S201 to S209 to be described below are executed on each frame to perform the object image stabilization in real time.

In step S201, the image sensor 102 outputs an object image formed by the optical system 101 as an analog signal corresponding to an object luminance, and the development processing unit 103 performs processing on the analog signal to generate an image signal. The development processing unit 103 causes the A/D conversion circuit (not illustrated) to convert the analog signal into, for example, a 14-bit digital signal. Further, a digital image signal on which signal level correction and white level correction are performed by the AGC circuit and the AWB circuit, which are not illustrated, is transmitted to each of the object detection unit 105 and the video image output unit 110 and is also stored and held in the memory 104. In the image capturing apparatus 100 according to the present exemplary embodiment, frame images are sequentially generated at a predetermined frame rate and the frame images to be transmitted, stored, and held are sequentially updated.

In step S202, the image capturing apparatus motion information obtaining unit 107 obtains image capturing apparatus motion information indicating a motion generated in the image capturing apparatus 100. The motion information obtained in step S202 is transmitted to the correction amount calculation unit 108.

In step S203, the object detection unit 105 detects the main object present in the frame image obtained in step S201. Even when a plurality of objects that can be detected as the main object is present in the image, one object is selected in the present exemplary embodiment. An example of the object selection method is a method in which the object detection unit 105 selects one object that is considered to be the most important object and outputs the selected object. For example, the main object may be selected on an assumption that the main object is an object that is larger than other objects, located closer to the center of the image, or higher in detection reliability. Another example of the object selection method is a method of prompting the user to select a principal object from among a plurality of object candidates.

In step S203, the position of the main object, the size of the main object, and the reliability of the main object (information indicating a likelihood of the main object being a person in a case where the main object is the person) are obtained. The positional information about the object detected in step S203 is transmitted to the object motion information obtaining unit 106.

In the present exemplary embodiment, a single object is selected as the main object, but instead a plurality of objects may be set as main objects to be tracked. In this case, for example, the main objects may be tracked such that the centroid position of each object is maintained at a specific position in the image. If it is detected that any one of the main objects is about to be outside the image capturing range, the main object may be tracked such that the main object is within the image capturing range.

In step S204, the object motion information obtaining unit 106 obtains the object motion information indicating a movement amount of the main object based on the positional information about the main object detected and selected in step S203. If the object is detected for the first time in the processing of step S203 in the current frame, step S204 for the current frame is skipped, and step S204 is performed from the subsequent frame to obtain the object motion information.

The method for obtaining the movement amount of the main object is not particularly limited. For example, the position of the main object may be obtained by known template matching using a partial image including the object detected as the main object in step S203 as a template. Then, positions of the main object in previous frames of the image and the position of the main object in the current frame are arranged in chronological order to obtain a relationship between time and the movement amount of the main object. If the main object is lost, the processing may be performed again from the object detection processing (step S203) by the object detection unit 105.

In step S205, the determination unit 111 determines whether to continue the object tracking or switch to the camera shake correction. The determination method is not particularly limited. An example of a method for automatically switching the control mode based on the object motion information will now be briefly described.

Figure 3A:
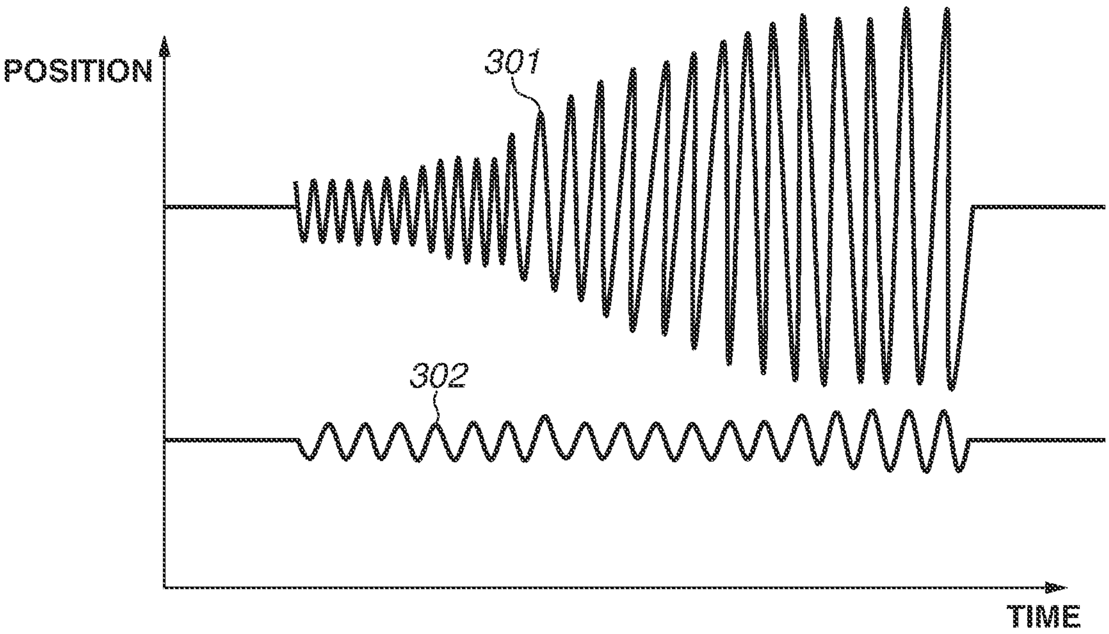
FIGS. 3A and 3B are graphs each illustrating switching from object tracking to camera shake correction.
Figure 3B:
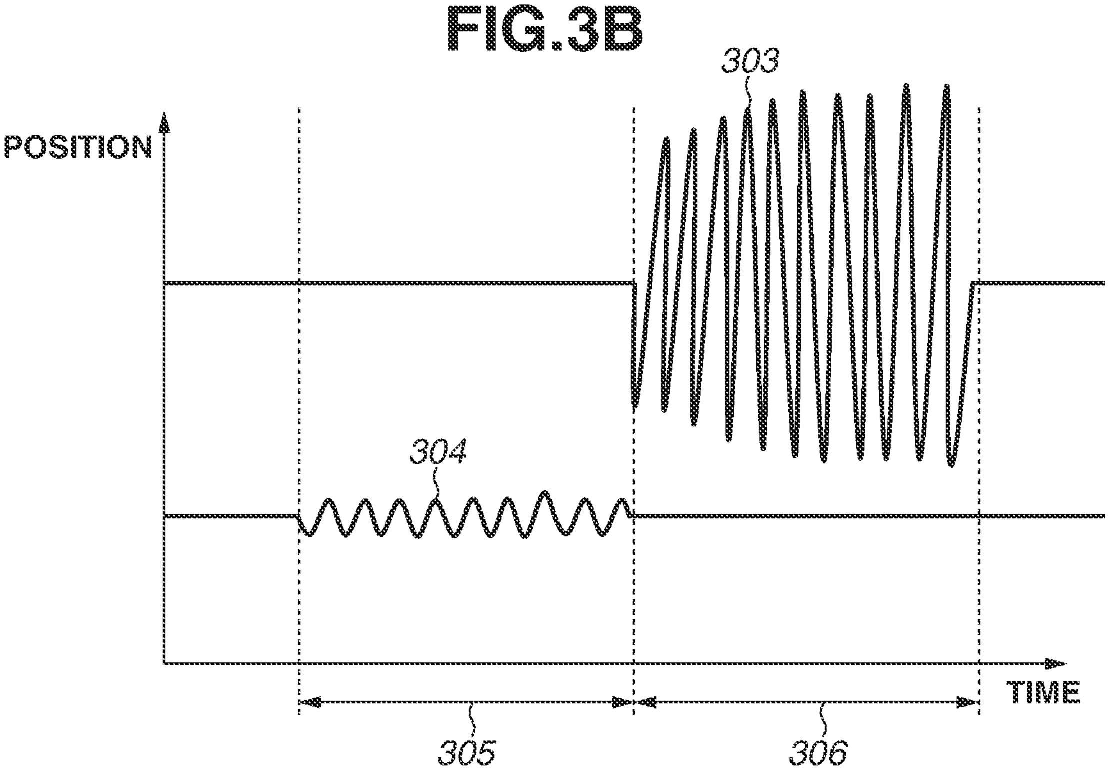

An effect of switching the correction control mode from the object tracking to the camera shake correction will be described with reference to FIGS. 3A and 3B. FIGS. 3A and 3B are graphs each illustrating a temporal change of a motion of the object and a motion of the image capturing apparatus 100. In FIGS. 3A and 3B, the horizontal axis represents time, and the vertical axis represents a position on the image. In the present exemplary embodiment, for convenience of illustration, a motion in one direction is illustrated as a graph. However, an actual motion on the image is a two-dimensional motion, and the same holds true for motions in other directions.

FIG. 3A is a schematic graph illustrating a motion blur and a camera shake that appear on an image in a case where an object moves and a camera shake occurs on the image. FIG. 3A illustrates a case where neither the object tracking nor the camera shake correction is carried out. A position 301 of the main object to be subjected to the object tracking changes with time, which indicates that the main object is making an amplitude motion. On the other hand, a motion due to a camera shake appearing on the image is representation of a motion that is applied to the image capturing apparatus 100 and appearing on the image. Accordingly, the motion due to the camera shake is a motion generated across the entire image unlike a motion of a local region such as the main object. For this reason, a position 302 of a background located at the center of the image in FIG. 3A is represented as the motion of the image capturing apparatus 100, i.e., the camera shake. Thus, if neither the object tracking nor the camera shake correction is carried out, both the motion blur and the camera shake appear on a video image.

FIG. 3B is a schematic graph illustrating a motion blur and a camera shake that appear on an image in a case where processing of switching from the object tracking to the camera shake correction is executed. FIG. 3B also illustrates a case where an object moves and a camera shake occurs on the image.

During a period of time indicated by a period 305, the object tracking is executed and the object image stabilization unit is controlled so that the position of the main object is maintained at a target position set in the image. Accordingly, a position 303 of the main object in the image does not change in the period 305, and the position of the main object image is maintained at the target position. On the other hand, the camera shake is not corrected, and thus a position 304 of the background located at the center of the image varies.

If the determination unit 111 determines that the variation in the position 303 that is the motion of the main object increases (see the position 301 of the main object illustrated in FIG. 3A) and the object tracking cannot be performed any more, the image stabilization unit is controlled to perform the camera shake correction in a subsequent period 306. Thus, in the period 306 and after, the position 303 of the main object varies, but the variation in the position 304 of the background that is the motion across the entire screen indicating the motion due to the camera shake can be reduced.

As described above, the automatic switching from the object tracking to the camera shake correction based on the main object motion information makes it possible to prevent a situation where the main object and the background move to a noticeable extent or more on the image, or to reduce a period in which such a situation occurs even if the situation occurs. FIGS. 3A and 3B illustrate not only a temporal variation in each of the positions 301 and 303 of the main object, but also a temporal variation in each of the positions 302 and 304 of the background, i.e., a temporal change of a motion applied to the image capturing apparatus 100. However, the image capturing apparatus motion information is not limited only to the information indicating the temporal variation as described above. Information indicating an angular velocity or an angle may be used depending on the time and situation.

In step S205, if the determination unit 111 determines to continue the object tracking (YES in step S205), the processing proceeds to step S206, and the object tracking is continued. On the other hand, if the determination unit 111 determines not to continue the object tracking (NO in step S205), the processing proceeds to step S207, and the control mode is switched to the camera shake correction.

In step S206, the correction amount calculation unit 108 calculates a correction amount based on a difference between the position of the object in the current frame on the image obtained by the object detection unit 105 and the target position. The correction amount is a correction amount for the object tracking. Alternatively, the correction amount calculation unit 108 may calculate the correction amount for the object tracking based on the object motion information obtained by the object motion information obtaining unit 106.

In step S207, a reference position setting unit 112 sets a reference position for the camera shake correction based on the object motion information. The reference position for the camera shake correction is a control center of the camera shake correction. Specifically, the reference position for the camera shake correction indicates a position of the image stabilization unit when the motion of the image capturing apparatus 100 is "0". The position of the image stabilization unit indicates a clipping position in a case where image stabilization is performed by geometric deformation as in the present exemplary embodiment, or indicates a position of a correction lens or an image sensor in a case where the image stabilization is performed by driving the correction lens or the image sensor in a direction different from an optical axis direction.

Figure 4A:
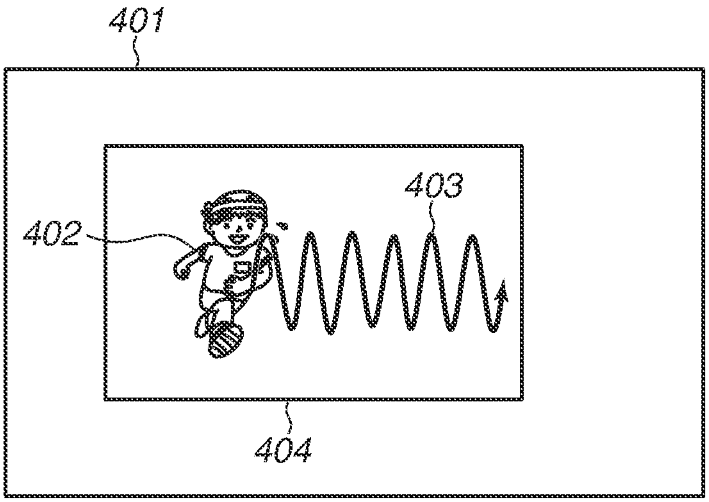
FIGS. 4A, 4B, and 4C each illustrate a clipping position during switching from the object tracking to the camera shake correction.
Figure 4B:
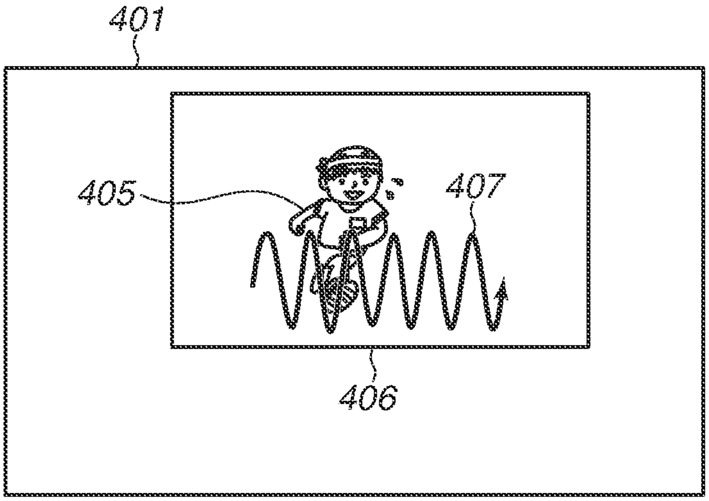
Figure 4C:
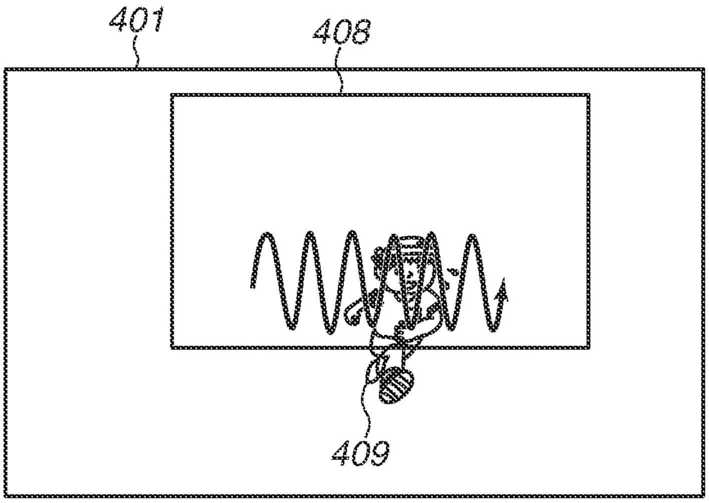

An effect of setting the reference position for the camera shake correction based on the object motion information will be described with reference to FIGS. 4A to 4C and FIG. 5. FIGS. 4A to 4C schematically illustrate a change of a clipping position of an image when the control mode for the geometric deformation unit 109 is switched from the object tracking to the camera shake correction. An outline of a rectangular region to be clipped when geometric deformation for electronic image stabilization processing is performed in the geometric deformation unit 109 is indicated by clipping frames 404, 406, and 408. An image within the rectangular region is eventually recorded or displayed. Accordingly, in the present exemplary embodiment, the area within the rectangular region indicates the image capturing range. The position of each clipping frame is moved depending on the motion of the object or the motion due to a camera shake, so that it is possible to track the object and generate the image on which the camera shake correction has been performed.

FIG. 4A schematically illustrates a relationship between the clipping frame 404 and an image 401 captured at time T1 when the object tracking is being executed. In FIG. 4A, the main object to be tracked is present at a position 402. Further, object motion information 403 indicates a motion of the main object in the subsequent period. As indicated by the object motion information 403, the main object moves rightward on the drawing sheet while moving up and down. In this case, since the object tracking is being executed, the clipping frame 404 is set, for example, at the position illustrated in FIG. 4A so that the main object is within the frame.

FIG. 4B schematically illustrates a relationship between the clipping frame 406 and the image 401 captured at time T2 when the object tracking is being executed. Time T2 is a timing after time T1.

If the main object has moved rightward on the drawing sheet relative to the position at time T1 as indicated by a position 405 in FIG. 4B, the position of the clipping frame 406 is also moved in an upper left direction on the drawing sheet relative to the position of the clipping frame 404 illustrated in FIG. 4A so that the main object continues to be within the clipping frame 406. Thus, during the period in which the object tracking is being executed, the position of the clipping frame is moved to follow the motion of the main object so that the position of the object is maintained at a specific position (also referred to as a target position) in the clipped image. Object motion information 407 illustrated in FIG. 4B indicates a motion of the main object in the subsequent period. If the object tracking is continued, the position of the clipping frame moves with the motion indicated by the object motion information 407. On the other hand, if the determination unit 111 determines to switch from the object tracking to the camera shake correction at this timing (time T2), the control mode for the geometric deformation unit 109 is switched from the object tracking to the correction of a camera shake occurring in the image capturing apparatus 100 based on the determination result.

FIG. 4C schematically illustrates a relationship among the image 401 captured at time T3 after switching from the object tracking to the camera shake correction occurs, a reference position for the camera shake correction, and the main object. If switching from the object tracking to the camera shake correction occurs, the clipping frame 408 of the image is moved so as to correct the motion due to the camera shake based on the position at this time (time T2) when the switching occurs as the reference position, instead of moving the clipping frame 408 to follow the motion of the object.

In other words, the position of the clipping frame 408 after switching to the camera shake correction coincides with the position of the clipping frame 406 at time T2 if the motion of the image capturing apparatus 100 is "0".

Meanwhile, since the main object continues to move, if the main object moves to, for example, a position 409, the main object is outside the clipping frame 408 that is moving for the camera shake correction. Thus, if the control mode for the geometric deformation unit 109 is switched from the object tracking to the camera shake correction without considering the position of the clipping frame, the camera shake may be suppressed, but the object in the image to be recorded or displayed may be partially outside the image capturing range. This results in capturing (recording) an image unintended by the user.

Accordingly, in the present exemplary embodiment, the reference position (that is, the control center of electronic camera shake correction) for the clipping frame in the image upon switching from the object tracking to the camera shake correction is set at a position where it is estimated that the object is less likely to be partially outside the image capturing range based on the object motion information. This increases the possibility of providing a video image intended by the user.

Figure 5:
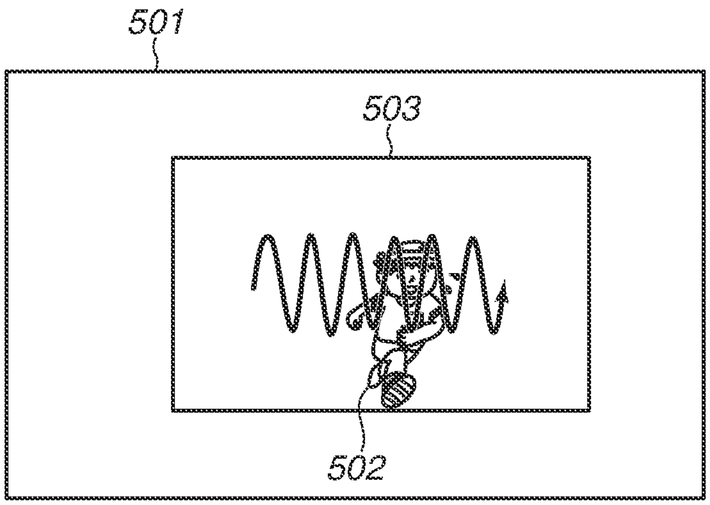
FIG. 5 illustrates an example of a reference position for a clipping frame.

FIG. 5 illustrates an example of setting the reference position for the clipping frame when the control mode is switched from the object tracking to the camera shake correction. In a captured image 501, an object to be tracked is present at a position 502 that is identical to the position 409 illustrated in FIG. 4C. In this case, a reference position 503 for the clipping frame is set at a position that is lower than the position of the clipping frame 406 at time T2 based on the object motion information indicating a temporal change of the position of the main object obtained up to time T2. This makes it possible to include the object within the image capturing range for a longer period of time even when the object continues to move thereafter, unlike in the case where the camera shake correction is performed based on the position of the clipping frame at the time (time T2) when the control mode is switched to the camera shake correction as illustrated in FIG. 4C as the reference position 408.

Specific examples of the method for setting the reference position for the clipping frame based on the object motion information will be described.

As a first example, a method for setting the reference position based on a centroid position of an object motion will be described. The centroid position of the object motion is calculated based on a temporal change of the position of the main object indicated by the object motion information, i.e., history information about the motion of the main object up to the current time (time T2). Then, the reference position is set at a position obtained by shifting the position of the clipping frame at the current time toward the centroid position. In other words, the reference position is set at a position where the distance from the reference position to the centroid position is smaller than the distance from the position of the clipping frame at the current time to the centroid position. The reference position may be set such that the centroid position is located at a position near the center of the clipping frame. This makes it possible to reduce the possibility of the main object being outside the image capturing range immediately after switching the control mode even when switching to the camera shake correction occurs at a peak of the object motion or at a moment when an object motion that greatly differs from the previous motion occurs. If the switching occurs at time T2, the main object is moving rightward while moving up and down until time T2, and thus the centroid position of the object motion is located in a lower left direction relative to the position 405 of the object at time T2 illustrated in FIG. 4B. Accordingly, as indicated by the reference position 503 illustrated in FIG. 5, the reference position is set at a position that is lower than the position of the clipping frame 406 at time T2.

A second specific example of the method for setting the reference position will be described. In this example, the motion of the main object in an image to be obtained is predicted based on the history of previous motion of the main object, and the reference position is set based on a prediction result. The reference position is set at a position obtained by shifting the position of the clipping frame at the current time in a direction in which the main object is to move as indicated by the prediction result, so that the possibility of the main object being within the image capturing range can be increased even when the main object continues to move after the switching. If switching occurs at time T2, since the main object is moving rightward while moving up and down until time T2, it can be predicted that the main object continues to move in the same manner hereafter. It can also be predicted that, based on a temporal change of the object position, the main object is currently moving up in the operation in the vertical direction, and immediately after this movement, the main object moves down. Then, while the main object moves in the vertical direction, it can be predicted that the possibility of the main object making an upward movement greater than that at the current time is not high. For this reason, as indicated by the reference position 503 illustrated in FIG. 5, the reference position can be set at a position that is lower than the position of the clipping frame 406 at time T2. Considering that it is predicted that the main object moves rightward, the reference position may be set at a lower right position relative to the position of the clipping frame 406 at time T2. Instead of predicting the direction of a future movement of the main object, a future position of the main object may be predicted. It can be predicted that the main object in an image to be obtained hereafter is more likely to be located at a lower right position relative to the current position based on a temporal change of the position of the main object up to time T2, and the reference position can be set at the lower right position relative to the position of the clipping frame 406 at time T2. Herein, the prediction of a further movement of the main object includes prediction of a future movement direction of the main object and prediction of a future position of the main object.

As described above, if the reference position is set based on the temporal change of the centroid position of the previous motion of the main object, it is possible to deal with a reciprocating motion such as an up-and-down movement, but it is difficult to deal with a motion in one direction such as a rightward movement. However, it is possible to set the reference position while dealing with the motion in one direction by setting the reference position based on the prediction result of the future movement of the main object.

Figure 6:
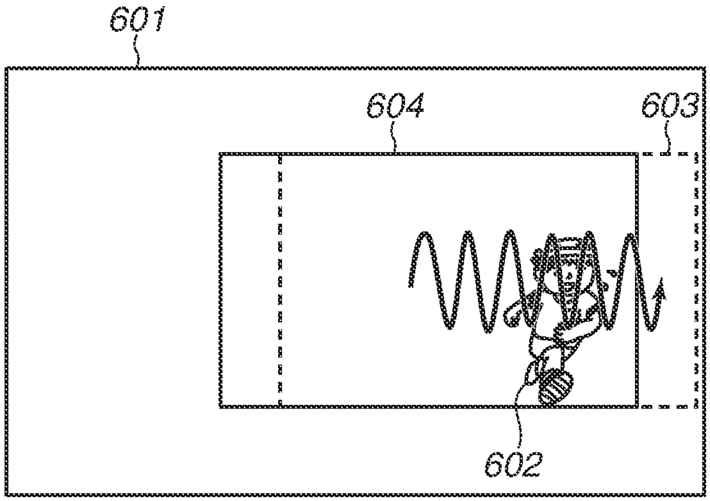
FIG. 6 illustrates an example of the reference position for the clipping frame.

Two specific examples of the reference position setting method have been described above. However, in a case where a main object 602 is present in the vicinity of an edge of an image 601 as illustrated in FIG. 6, it is required to adjust the reference position so as to prevent the reference position from being set outside the image 601. Further, in the case of adjusting the reference position, if a reference position 603 is set in the immediate vicinity of an edge of the image 601, a margin region for moving the clipping position for the camera shake correction becomes insufficient to enable the camera shake correction function. Thus, to actually determine the reference position for the clipping frame on the image, it is required to set a reference position 604 at a certain distance from an edge of the image as illustrated in FIG. 6 to secure the margin region. The margin region setting method is not particularly limited. A predetermined fixed value or a value that varies depending on various settings (focal length, image capturing mode, etc.) of the image capturing apparatus 100 may be used. Alternatively, an apparent amount of camera shake appearing on the image may be calculated based on the magnitude of the camera shake occurring in the image capturing apparatus 100 that is obtained from the image capturing apparatus motion information obtaining unit 107 immediately before switching to the camera shake correction, and the calculated amount of camera shake may be set as the size of the margin region. As another example of the margin region setting method, the frequency or amplitude of a motion to be subjected to the camera shake correction may be set in advance, and the margin region may be calculated in consideration of focal length information or the like during image capturing.

Figure 7:
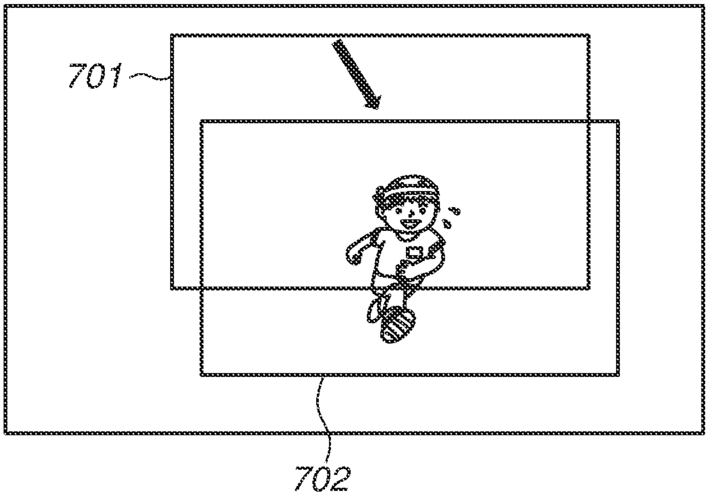
FIG. 7 illustrates a method for moving a control center.

In the case of switching from the object tracking to the camera shake correction, a discontinuity, such as image skipping, may occur in a video image displayed or recorded when the reference position for the clipping frame is switched, resulting in a video image that gives the user a feeling of strangeness. To avoid such a situation, there is a method of moving the reference position that is used after the control mode is switched to the camera shake correction as illustrated in FIG. 7 in which the control center of the camera shake correction is moved little by little (gradually) from the position of the clipping frame set during the object tracking to the reference position set by the above-described method. FIG. 7 schematically illustrates a method for gradually moving the control center from the position of a clipping frame 701 set during the object tracking (time T2) to a set reference position 702. The actual position of the clipping frame varies depending on the motion amount of the image capturing apparatus 100 to correct the camera shake. Accordingly, in FIG. 7, a case where the motion amount of the image capturing apparatus 100 is 0 is illustrated. As the control center of the camera shake correction is gradually moved, the position of the clipping frame moves and a still object (background) included in the image capturing range changes during a predetermined period of time immediately after switching from the object tracking to the camera shake correction even when the motion amount of the image capturing apparatus 100 is 0.

As a method for moving the control center, basically, the control center may be moved at a constant speed from the position of the clipping frame (e.g., the position of the clipping frame 406 illustrated in FIG. 4B) immediately before the switching to the set reference position (e.g., the reference position 503 illustrated in FIG. 5).

A movement speed of the control center is not necessarily a constant speed. For example, the movement speed may be changed depending on a movement speed of the main object or a magnitude of a camera shake. For example, if the main object is moving at a high speed, the possibility of the object being outside the clipping frame can be reduced by increasing the movement speed. On the other hand, if the magnitude of a camera shake is large, a variation in the background due to the movement of the position of the clipping frame can be suppressed by decreasing the movement speed, so that a more natural video image can be obtained.

In this case, if the user continues to capture images so as to follow an object even after the control mode is switched to the camera shake correction, a deviation may occur between an image region to be actually clipped and the reference position for the clipping frame set when the control mode is switched to the camera shake correction by a camerawork motion. In this case, the deviation in the reference position for the clipping frame can be corrected by subtracting the motion of the image capturing apparatus 100 obtained from the image capturing apparatus motion information obtaining unit 107 from the original reference position. In other words, after the control mode is switched to the camera shake correction, the direction and speed of the movement of the image capturing apparatus 100 are obtained from the image capturing apparatus motion information obtaining unit 107, and the obtained direction and speed are converted into the movement amount on the image. Then, the converted movement amount is sequentially subtracted from the reference position for the clipping frame that is originally set by the above-described method, and the reference position is set and updated based on a subtraction result. This makes it possible to reduce the deviation between the reference position for the clipping frame and the image region to be clipped that is intended by the user. It is generally known that the frequency of a motion due to a camera shake is different from the frequency of a panning or tilting motion. Thus, the motion corresponding to the frequency of the panning or tilting motion may be extracted from the motion of the image capturing apparatus 100. The extracted motion may be converted into the movement amount on the image, and the movement amount may be subtracted from the originally-set reference position.

In step S208, the correction amount calculation unit 108 calculates the correction amount for the camera shake correction.

The correction amount indicates an amount by which the clipping frame is to be moved from the reference position set in step S207 to correct the motion of the image capturing apparatus 100, and the correction amount can be calculated based on the image capturing apparatus motion information obtained from the image capturing apparatus motion information obtaining unit 107. Then, the final position of the clipping frame is calculated based on the calculated correction amount and the reference position set in step S207.

In step S209, geometric deformation processing for the object tracking or the camera shake correction is performed by the geometric deformation unit 109 based on the correction amount calculated by the correction amount calculation unit 108, to perform the image stabilization processing. The frame image which is obtained as described above and in which a blur (due to a camera shake or a motion blur) has been corrected is transmitted to the video image output unit 110. The video image output unit 110 displays the frame image subjected to the image stabilization processing on a monitor or the like (not illustrated), or stores and holds the frame image in an image storage device.

As described above, the image capturing apparatus 100 according to the present exemplary embodiment sets the reference position for the camera shake correction based on the motion information about the main object to be tracked when switching from the object tracking to the camera shake correction. Accordingly, it is possible to reduce the possibility of the object being outside the image capturing range immediately after switching from the object tracking to the camera shake correction.

While the exemplary embodiment described above illustrates a mode in which the camera shake correction is not performed during the object tracking and the object tracking is not performed during the camera shake correction for ease of explanation, the present exemplary embodiment is not limited to this mode. The motion of the image capturing apparatus 100 may be corrected also during the object tracking, or the change of the object position in the image may be corrected also during the camera shake correction. In other words, the same effect can be obtained if the reference position is set as described above when the control mode is switched from the mode for giving priority to the object tracking to the mode for giving priority to the camera shake correction.

While the exemplary embodiment described above illustrates an example where the image capturing apparatus 100 controls the geometric deformation unit 109 serving as the image stabilization unit, the image stabilization unit is not limited thereto. Any image stabilization method may be used as long as the object tracking and the camera shake correction can be performed by controlling at least one of widely-known image stabilization methods such as lens-type image stabilization, sensor-type image stabilization, and electronic image stabilization.

The lens-type image stabilization is a function for correcting an image blur by driving (displacing) the correction lens included in the optical system 101 in a direction different from an optical axis. The correction lens is driven based on the correction amount calculated by the correction amount calculation unit 108, thereby it is possible to correct an image blur. The correction lens and an actuator for displacing the correction lens can constitute the image stabilization unit.

The sensor-type image stabilization is a function for correcting an image blur by driving (displacing) the image sensor 102 in the direction different from the optical axis. The image sensor 102 is driven based on the correction amount calculated by the correction amount calculation unit 108, thereby it is possible to correct an image blur. The image sensor 102 and an actuator for displacing the image sensor 102 can constitute the image stabilization unit. The electronic image stabilization, as described above, is a function for correcting an image blur by performing image processing such as geometric deformation on the obtained image signal. The geometric deformation unit 109 can constitute the image stabilization unit.

In the case of performing the camera shake correction using the lens-type image stabilization or the sensor-type image stabilization, the center of the reference position for the clipping frame described above with reference to FIGS. 5 to 7 corresponds to a value obtained by converting a driving center of the correction lens or the image sensor 102 into a coordinate position on the image. In the case of performing the camera shake correction using a plurality of image stabilization units, a value obtained by adding, as needed, the value obtained by converting the driving center of the correction lens into a coordinate position, the value obtained by converting the driving center of the image sensor 102 into a coordinate position, and the center of the reference position for the clipping frame becomes the center of the reference position for the clipping frame on the image.

The exemplary embodiment has been described above on an assumption that an object motion is a one-dimensional motion. However, an actual motion blur and camera shake on an image are two-dimensional motions. It may be determined whether to continue the object tracking or switch the control mode to the camera shake correction for each motion direction, for example, a vertical direction and a horizontal direction. In this case, in step S207, the reference position in the direction of switching the control mode to the camera shake correction is set based on the object motion information in the direction in which the reference position is switched.

The exemplary embodiment described above illustrates an example where the image capturing apparatus 100 serves as the image stabilization apparatus. However, the image stabilization apparatus may be separate from the image capturing apparatus 100 as long as input of an image can be received from the image capturing apparatus 100. For example, an image processing apparatus configured to perform the electronic image stabilization as described above may receive input of an image from the image capturing apparatus 100, may perform the above-described object detection processing, object motion determination processing, and the like on the input image, and may perform the electronic image stabilization based on the determination result.

While the above-described exemplary embodiment illustrates an example of capturing a moving image, the image to be captured is not limited to the moving image as long as a plurality of continuous images is obtained. For example, the disclosure can also be applied to continuous image capturing of still images.

In the exemplary embodiments described above, the method for determining whether to switch from the object tracking to the camera shake correction is not particularly limited. However, in the case of automatically switching the control mode based on main object information, such as a temporal change of the main object position or the movement speed of the main object, it is highly likely that switching to the camera shake correction occurs at a peak of the object motion or at a moment when an object motion that greatly differs from the previous motion occurs. Therefore, it is considered that setting the reference position based on information about a temporal change of the object position as in the exemplary embodiment described above is more effective.

The exemplary embodiment of the disclosure has been described above. However, the disclosure is not limited to the exemplary embodiment, and various modifications and changes can be made within the scope of the disclosure.

According to an aspect of the disclosure, it is possible to reduce the possibility of an object being outside an image capturing range immediately after switching from the object tracking to the camera shake correction even when the control mode is switched from the object tracking to the camera shake correction.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-050402, filed Mar. 27, 2023, which is hereby incorporated by reference herein in its entirety.

What is claimed is:

1. An apparatus comprising one or more processors and/or circuitry which function as:

- a detection unit configured to detect an object from an image;
- a first obtaining unit configured to obtain object motion information indicating information about a temporal change of a position of the object detected in the image;
- a second obtaining unit configured to obtain image motion information indicating a motion of a capturing apparatus configured to capture the image;
- a control unit configured to control a stabilization unit using a first mode for giving priority to object tracking to correct the position of the object in the image and a second mode for giving priority to stabilization to correct an image blur due to the motion of the capturing apparatus;

a determination unit configured to determine whether to switch from the first mode to the second mode; and a setting unit configured to set a reference position being a control center of the stabilization based on the object motion information in a case where the determination unit determines to switch from the first mode to the second mode, wherein the setting unit obtains a centroid position of a motion of the object based on a temporal change of the motion of the object indicated by the object motion information, and sets the reference position based on the obtained centroid position.

2. The apparatus according to claim 1, wherein after switching to the second mode, the control unit controls the stabilization unit in the second mode by calculating a correction amount from the reference position based on the image motion information.

3. The apparatus according to claim 1, wherein the control unit controls the stabilization by displacing a correction lens in the second mode, the correction lens being included in an optical system configured to capture the image, and wherein the reference position is a position of the correction lens in a case where the motion of the capturing apparatus indicated by the capturing apparatus motion information is 0.

4. The apparatus according to claim 1, wherein the control unit controls the stabilization by displacing a sensor configured to capture the image, and wherein the reference position is a position of the sensor in a case where the motion of the capturing apparatus indicated by the capturing apparatus motion information is 0.

5. The apparatus according to claim 1, wherein the control unit controls the stabilization by geometric deformation, and wherein the reference position is a clipping position in a case where the motion of the capturing apparatus indicated by the image motion information is 0.

6. The apparatus according to claim 1, wherein the setting unit sets, as the reference position, a position obtained by adding a margin for the stabilization to the centroid position.

7. The apparatus according to claim 1, wherein the setting unit predicts a motion of the object based on a temporal change of the motion of the object indicated by the object motion information, and sets the reference position based on a result of prediction.

8. The apparatus according to claim 7, wherein the setting unit predicts a movement direction of the object, and sets a position obtained by moving a position of the stabilization unit at a timing of switching in the movement direction as the reference position.

9. The apparatus according to claim 7, wherein the setting unit predicts the position of the object in an image to be obtained based on the temporal change of the motion of the object indicated by the object motion information, and sets the reference position based on the predicted position.

10. The apparatus according to claim 9, wherein the setting unit sets, as the reference position, a position obtained by moving a position of the stabilization unit at a timing of switching closer to the predicted position of the object.

11. The apparatus according to claim 1, wherein after switching, the control unit gradually moves the control center of the stabilization from a position of the stabilization unit at a timing of the switching to the reference position based on the object motion information.

12. The apparatus according to claim 11, wherein the control unit performs the stabilization to correct the image blur due to the motion of the capturing apparatus while gradually moving the control center of the stabilization.

13. The apparatus according to claim 1, wherein after switching, the control unit controls the stabilization unit such that a still object included in a capturing range changes based on the reference position even in a case where the motion of the capturing apparatus indicated by the capturing apparatus motion information is 0.

14. The apparatus according to claim 1, wherein the control unit moves the control center of the stabilization based on the reference position set based on the object motion information and the motion of the capturing apparatus obtained from the image motion information.

15. The apparatus according to claim 1, further comprising a sensor, wherein the detected object from the image is obtained using the sensor.

16. A method for an apparatus, comprising:

detecting an object from an image;

obtaining object motion information indicating information about a temporal change of a position of the object detected in the image;

obtaining image motion information indicating a motion of a capturing apparatus configured to capture the image;

controlling a stabilization unit using a first mode for giving priority to object tracking to correct the position of the object in the image and a second mode for giving priority to stabilization to correct an image blur due to the motion of the capturing apparatus;

determining whether to switch from the first mode to the second mode; and setting a reference position being a control center of the stabilization based on the object motion information in a case where it is determined to switch from the first mode to the second mode, wherein the setting obtains a centroid position of a motion of the object based on a temporal change of the motion of the object indicated by the object motion information, and sets the reference position based on the obtained centroid position.

17. The method according to claim 16, wherein after switching to the second mode, the controlling controls the stabilization unit in the second mode by calculating a correction amount from the reference position based on the image motion information.

18. A non-transitory computer-readable storage medium storing a program for causing a computer to execute a method, the method comprising:

detecting an object from an image;

obtaining object motion information indicating information about a temporal change of a position of the object detected in the image;

obtaining image motion information indicating a motion of a capturing apparatus configured to capture the image;

controlling a stabilization unit using a first mode for giving priority to object tracking to correct the position of the object in the image and a second mode for giving priority to stabilization to correct an image blur due to the motion of the capturing apparatus;

determining whether to switch from the first mode to the second mode; and setting a reference position being a control center of the stabilization based on the object motion information in a case where it is determined to switch from the first mode to the second mode, wherein the setting obtains a centroid position of a motion of the object based on a temporal change of the motion of the object indicated by the object motion information, and sets the reference position based on the obtained centroid position.

19. The non-transitory computer-readable storage medium according to claim 18, wherein after switching to the second mode, the controlling controls the stabilization unit in the second mode by calculating a correction amount from the reference position based on the image motion information.

* * * * *